(12) United States Patent
Qiu et al.

(10) Patent No.: US 9,148,308 B2
(45) Date of Patent: Sep. 29, 2015

(54) APPARATUS FOR REDUCING NETWORK TRAFFIC IN A COMMUNICATION SYSTEM

(75) Inventors: Chaoxin Qiu, Austin, TX (US); Arshad Khan, Austin, TX (US); Niral Sheth, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/471,544

(22) Filed: May 15, 2012

(65) Prior Publication Data

US 2013/0308627 A1 Nov. 21, 2013

(51) Int. Cl.
| | |
|---|---|
| H04W 60/00 | (2009.01) |
| H04L 9/32 | (2006.01) |
| H04W 12/06 | (2009.01) |
| H04W 8/04 | (2009.01) |
| H04L 12/66 | (2006.01) |
| H04W 8/24 | (2009.01) |

(52) U.S. Cl.
CPC .............. H04L 12/66 (2013.01); H04W 8/04 (2013.01); H04W 60/00 (2013.01); *H04W 8/24* (2013.01)

(58) Field of Classification Search
CPC ............ H04L 65/1073; H04L 61/1588; H04L 29/12188; H04L 29/06217; H04L 61/309; H04W 8/04
See application file for complete search history.

(56) References Cited

U.S. PATENT DOCUMENTS

| | | | |
|---|---|---|---|
| 2006/0077925 A1 | 4/2006 | Rune | |
| 2006/0077965 A1* | 4/2006 | Garcia-Martin et al. | 370/352 |
| 2006/0271693 A1 | 11/2006 | Thiebaut | |
| 2007/0143834 A1* | 6/2007 | Leinonen et al. | 726/5 |
| 2007/0190990 A1* | 8/2007 | Yin | 455/414.3 |
| 2007/0213051 A1 | 9/2007 | Durecu et al. | |
| 2008/0133762 A1 | 6/2008 | Edge et al. | |
| 2010/0039930 A1* | 2/2010 | Liang et al. | 370/216 |
| 2010/0167734 A1* | 7/2010 | Jones et al. | 455/435.1 |
| 2010/0182997 A1* | 7/2010 | Yang et al. | 370/352 |
| 2010/0299451 A1 | 11/2010 | Yigang et al. | |
| 2011/0066530 A1 | 3/2011 | Cai | |
| 2011/0083014 A1* | 4/2011 | Lim | 713/168 |
| 2011/0208628 A1 | 8/2011 | Foottit | |

(Continued)

OTHER PUBLICATIONS

3GPP, "3rd Generation Partnership Project; Technical Specification Group Core Network and Terminals; IP Multimedia (IM) Subsystem Cx and Dx interfaces; Signalling flows and message contents (Release 9)", 3GPP TS 29.228 V9.1.0 (Mar. 2010).

(Continued)

*Primary Examiner* — Asad Nawaz
*Assistant Examiner* — Jason Harley
(74) *Attorney, Agent, or Firm* — Guntin & Gust, PLC; Ralph Trementozzi (57) ABSTRACT

A system that incorporates teachings of the present disclosure may include, for example, an application server that includes a memory storing computer instructions, and a processor coupled to the memory. The processor responsive to executing the computer instructions can perform operations including transmitting to Home Subscriber Server (HSS) a User Data Request (UDR) command without initiating a third party registration process, where the UDR command includes a request for dynamic device information associated with a communication device, and receiving from the HSS a User Data Answer (UDA) command comprising the dynamic device information associated with the communication device. Other embodiments are disclosed.

20 Claims, 5 Drawing Sheets

(56) References Cited

U.S. PATENT DOCUMENTS

| | | |
|---|---|---|
| 2011/0225281 A1 | 9/2011 | Riley |
| 2012/0030017 A1 | 2/2012 | Jones et al. |
| 2012/0158872 A1 | 6/2012 | McNamee et al. |
| 2012/0158994 A1 | 6/2012 | McNamee et al. |
| 2012/0221899 A1 | 8/2012 | Cervenak et al. |
| 2013/0084826 A1 | 4/2013 | Mo et al. |

OTHER PUBLICATIONS

3GPP, "3rd Generation Partnership Project; Technical Specification Group Core Network and Terminals; IP Multimedia (IM) Subsystem Sh interface; Signalling flows and message contents (Release 9)", 3GPP TS 29.328 V9.2.0 (Jun. 2010).

3GPP, "3rd Generation Partnership Project; Technical Specification Group Core Network and Terminals; Sh Interface based on the Diameter protocol; Protocol details (Release 9)", 3GPP TS 29.329 V9.2.0 (Jun. 2010).

3GPP, "3rd Generation Partnership Project; Technical Specification Group Core Network; Cx and Dx interfaces based on the Diameter protocol; Protocol details (Release 5)", 3GPP TS 29.229 V5.13.0 (Sep. 2007).

Nokia, "NAF-BSF (D interface) protocol", 3GPP TSG SA WG3 Security—S3#28, Berlin, Germany, May 6-9, 2003.

Rosenberg, "Caller Preferences for the Session Initiation Protocol (SIP)", Cisco Systems, Aug. 2004.

Rosenberg, "Indicating User Agent Capabilities in the Session Initiation Protocol (SIP)", Cisco Systems, Aug. 2004.

Rosenberg, "Obtaining and Using Globally Routable User Agent URIs (GRUUs) in the Session Initiation Protocol (SIP)", Cisco Systems, Network Working Group, Oct. 2009.

* cited by examiner

APPARATUS FOR REDUCING NETWORK TRAFFIC IN A COMMUNICATION SYSTEM

FIELD OF THE DISCLOSURE

The present disclosure relates generally to an apparatus for reducing network traffic in a communication system.

BACKGROUND

In packet-switched communication systems, such as an Internet Protocol Multimedia Subsystem (IMS) network, it may be common for millions of communication devices to register with a server office of the IMS network. When a server office fails to provide services due to a catastrophic event such as an earthquake or other unexpected event, the communication devices may overload the IMS network with registration requests that could adversely affect the performance of the IMS network. Other sources of network traffic may occur in an IMS network. Accordingly, techniques for reducing network traffic would be desirable to network service providers.

DETAILED DESCRIPTION

The present disclosure describes, among other things, illustrative embodiments to avoid excessive network traffic caused by, for example, re-registration requests initiated by communication devices due to a communication fault in an Internet Protocol Multimedia Subsystem (IMS) network, or other sources of network traffic such as third party registrations. An embodiment of the present disclosure avoids excessive re-registrations processing by avoiding third party registration requests initiated by a Call Session Control Function (CSCF) server.

One embodiment of the present disclosure describes a CSCF server that includes a memory storing computer instructions, and a processor coupled to the memory. The processor responsive to executing the computer instructions can perform operations including receiving a registration request initiated by a communication device to acquire service from a communication network from which the CSCF server operates, determining whether the registration request includes dynamic device information comprising a Globally Routable User Agent Uniform Resource Identifier (GRUU) assigned to the communication device and one or more feature tags descriptive of operational features of the communication device, and transmitting to a Home Subscriber Server (HSS) a multimedia authentication request (MAR) command including the dynamic device information for storage in the HSS responsive to determining that the registration request includes the dynamic device information.

One embodiment of the present disclosure describes an application server that includes a memory storing computer instructions, and a processor coupled to the memory. The processor responsive to executing the computer instructions can perform operations including transmitting to an HSS a User Data Request (UDR) command without initiating a third party registration process, where the UDR command includes a request for dynamic device information associated with a communication device, and receiving from the HSS a User Data Answer (UDA) command comprising the dynamic device information associated with the communication device.

One embodiment of the present disclosure describes an HSS that includes a memory storing computer instructions, and a processor coupled to the memory. The processor responsive to executing the computer instructions can perform operation including receiving from a CSCF server an MAR command including dynamic device information associated with a communication device for storage in the memory, receiving from an application server a UDR command including a request for the dynamic device information associated with a communication device, retrieving the dynamic device information from the memory responsive to the UDR command, and transmitting to the application server a UDA command comprising the dynamic device information.

One embodiment of the present disclosure describes a method for transmitting, by a CSCF server, to an HSS a MAR command including dynamic device information associated with a communication device, storing, by the HSS, the dynamic device information, transmitting, by an application server, to the HSS a UDR command including a request for the dynamic device information associated with the communication device, and transmitting, by the HSS, to the application server a UDA command comprising the dynamic device information.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 1:
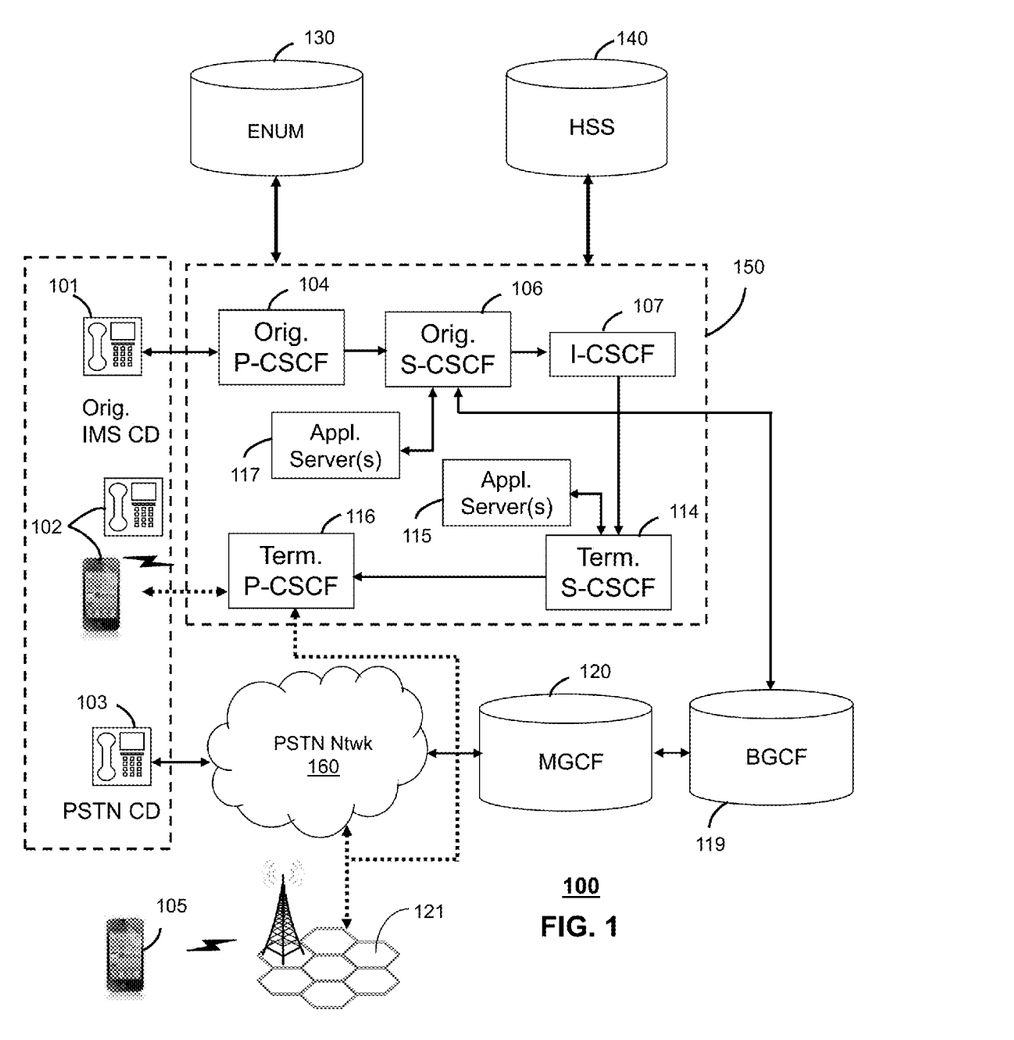
FIG. 1 depicts an illustrative embodiment of a communication system.

FIG. 1 depicts an illustrative embodiment of a communication system 100 employing an IMS network architecture to facilitate the combined services of circuit-switched and packet-switched communication systems. Communication system 100 can comprise an HSS 140, a tElephone NUmber Mapping (ENUM) server 130, and other network elements of an IMS network 150. The IMS network 150 can establish communications between IMS-compliant communication devices (CDs) 101, 102, Public Switched Telephone Network (PSTN) CDs 103, 105, and combinations thereof by way of a Media Gateway Control Function (MGCF) 120 coupled to a PSTN network 160. The MGCF 120 need not be used when a communication session involves IMS CD to IMS CD communications. A communication session involving at least one PSTN CD may utilize the MGCF 120.

IMS CDs 101, 102 can register with the IMS network 150 by contacting a Proxy Call Session Control Function (P-CSCF) which communicates with an interrogating CSCF, which in turn, communicates with a Serving CSCF (S-CSCF)

to register the CDs with the HSS 140. To initiate a communication session between CDs, an originating IMS CD 101 can submit a Session Initiation Protocol (SIP INVITE) message to an originating P-CSCF 104 which communicates with a corresponding originating S-CSCF 106. The originating S-CSCF 106 can submit the SIP INVITE message to one or more application servers (AS) 117 that can provide a variety of services to IMS subscribers.

For example, the application servers 117 can be used to perform originating call feature treatment functions on the calling party number received by the originating S-CSCF 106 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 106 can submit queries to the ENUM system 130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE message to the terminating S-CSCF 114. The terminating S-CSCF 114 can then identify a terminating P-CSCF 116 associated with the terminating CD 102. The P-CSCF 116 may then signal the CD 102 to establish Voice over Internet Protocol (VoIP) communication services, thereby enabling the calling and called parties to engage in voice and/or data communications. Based on the iFCs in the subscriber profile, one or more terminating application servers 115 may be invoked to provide various call terminating feature services, such as call forwarding no answer, do not disturb, music tones, simultaneous ringing, sequential ringing, etc.

In some instances the aforementioned communication process is symmetrical. Accordingly, the terms "originating" and "terminating" in FIG. 1 may be interchangeable. It is further noted that the communication system 100 can be adapted to support video conferencing. It is further contemplated that the CDs of FIG. 1 can operate as wireline or wireless devices. The CDs of FIG. 1 can be communicatively coupled to a cellular base station 121, a femtocell (not shown), a WiFi router, a DECT base unit, or another suitable wireless access unit to establish communications with the IMS network 150 of FIG. 1.

If the terminating communication device is instead a PSTN CD such as CD 103 or CD 105 (in instances where the cellular phone only supports circuit-switched voice communications), the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN CD over the PSTN network 160 to enable the calling and called parties to engage in voice and/or data communications.

The cellular access base station 121 can operate according to wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Multiple wireline and wireless communication technologies are therefore contemplated for the CDs of FIG. 1.

It is further contemplated that cellular phones supporting LTE can support packet-switched voice and packet-switched data communications and thus may operate as IMS-compliant devices. In this embodiment, the cellular base station 121 may communicate directly with the IMS network 150 as shown by the arrow connecting the cellular base station 121 and the P-CSCF 116.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Figure 2:
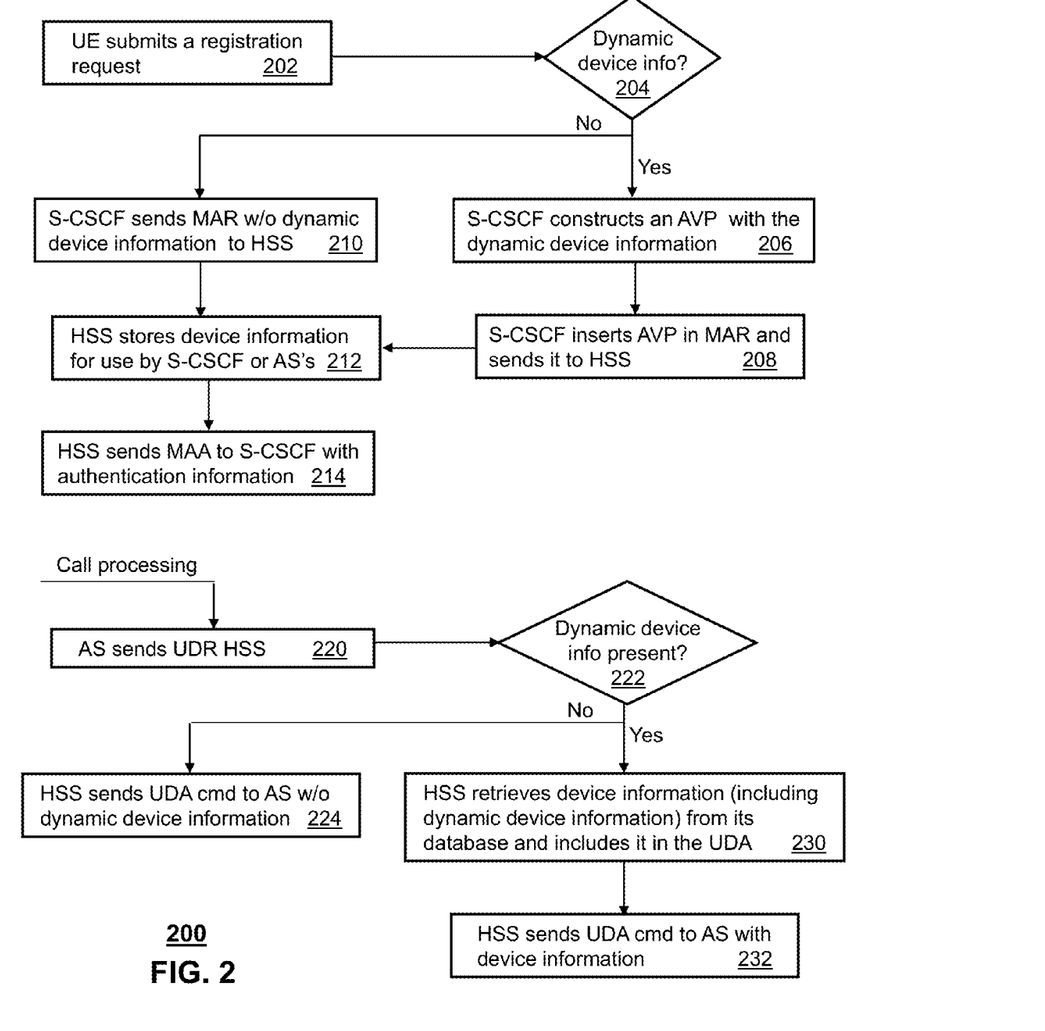
FIGS. 2-3 depicts illustrative embodiments of methods operating in portions of the communication system of FIG. 1.
Figure 3:
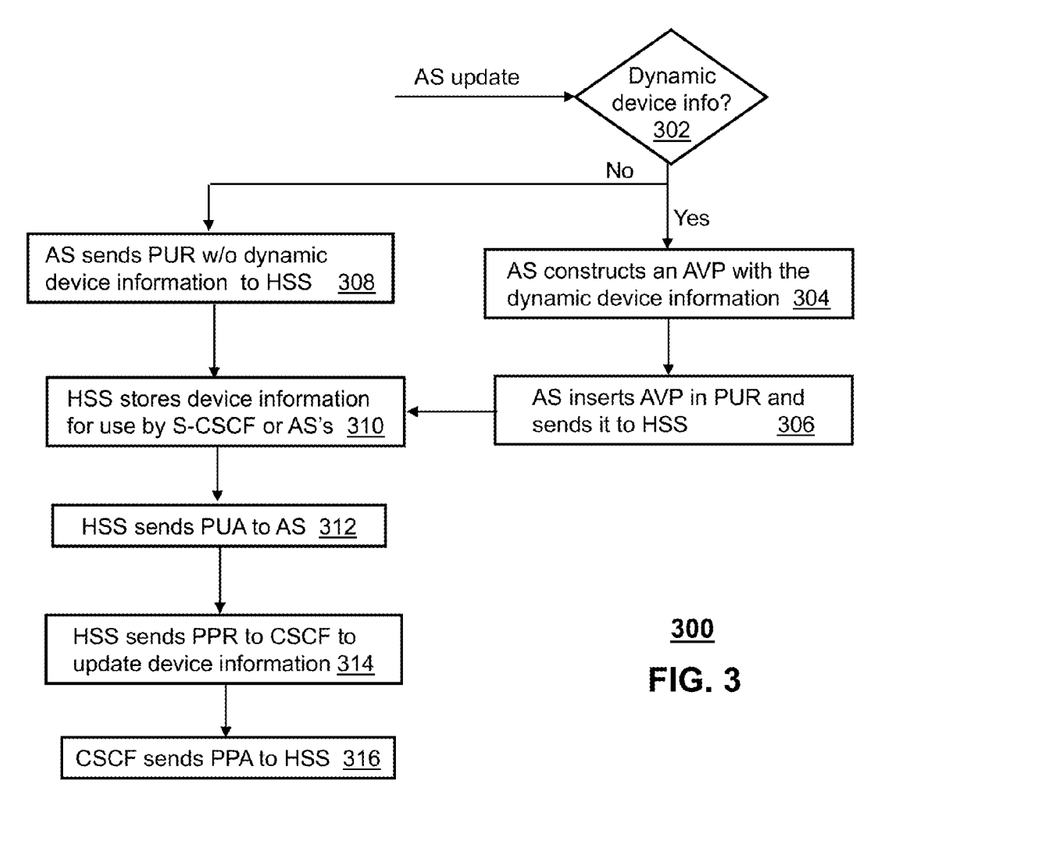
Figure 4:
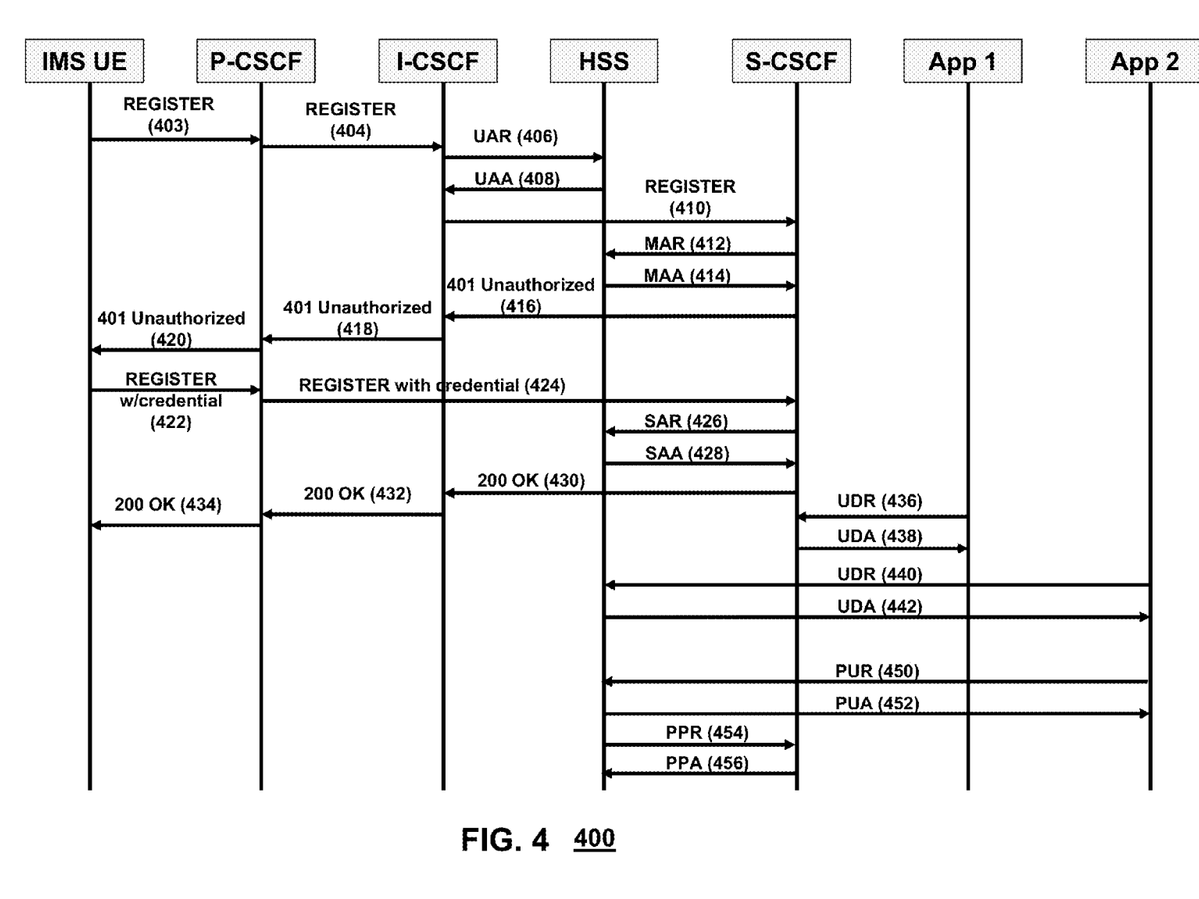
FIG. 4 depicts an illustrative embodiment of a signal flow diagram descriptive of the method of FIGS. 2-3.

Referring back to FIG. 1, the P-CSCFs 104 and 116 and the S-CSCFs 106 and 114 can be adapted to avoid excessive third party registrations and thereby mitigate network traffic issues caused by, for example, failover re-registrations resulting from communication faults in the IMS network 150 according to embodiments of methods 200-300 as described in FIGS. 2-3. FIG. 4 depicts an illustrative embodiment of a signal flow descriptive of methods 200-300. Accordingly, methods 200-300 will be described in conjunction with the flow steps of FIG. 4.

Method 200 can begin with 202 in which an IMS communication device such as the IMS CD of FIG. 1 submits a registration request which is processed by an S-CSCF. This process is shown at flow steps 403-410 of FIG. 4. At method step 204, the S-CSCF determines whether the registration request includes dynamic device information such as a Globally Routable User Agent Uniform Resource Identifier (GRUU) assigned to the IMS communication device and one or more feature tags descriptive of operational features of the IMS communication device. The GRUU can represent a single communication identifier (such as a single telephone number) that can be shared with a number of other communication devices of a subscriber of the IMS network. The feature tags can be descriptive of the computing, graphical, audio, and communication features of the communication device. For example, a smartphone of the subscriber may have certain features that differ from a computer of the subscriber although both devices share the same GRUU. The feature tags would identify the distinct features of each device. An illustration of GRUU's and feature tags is given below.

For a mobile phone: feature tags are provided in the contact header of the device registration request, and the GRUU ID assigned by S-CSCF (as shown in the "200 OK" response):
Register
PUID sip:+15122968826@att.net
PRID R1

Contact: mmtel, +g.3gpp.smsip, "RCS" messaging feature tags,
200OK
P-associated-URI:+15122968826@att.net, GRUU G1

For another device such as a computer or Web client device of the subscriber: feature tags are provided in the contact header of the device registration request, and the GRUU ID assigned by S-CSCF (as shown in the "200 OK" response):
Register
PUID: sip:+15122968826@att.net
PRID R2
Contact: mmtel, sip:mobility="fixed", "RCS" messaging feature tags
200OK
P-associated-URI:+15122968826@att.net. GRUU G2

If the S-CSCF determines that dynamic device information is present in the registration request, it proceeds to method step 206 where it constructs an Attribute Value Pair (AVP) field that includes the dynamic device information retrieved from the registration request. At method step 208, the S-CSCF inserts the AVP field into a multimedia authentication request (MAR) DIAMETER command which it then transmits to an HSS, at flow step 412, of FIG. 4. Upon receiving the MAR command, the HSS at method step 212 retrieves the dynamic device information included in the AVP field and stores it in memory in a manner that associates the dynamic device information to the IMS communication device for future retrieval by a requesting CSCF or application server as will be discussed below. Referring back to step 204, if the S-CSCF determines that dynamic device information is not present in the registration request, the S-CSCF proceeds to method step 210 where it transmits device information to the HSS an MAR command without "dynamic" device information such as a GRUU and/or feature tags. Once the MAR command is processed, the HSS can transmit at method step 214 to the S-CSCF a multimedia authentication answer (MAA) DIAMETER command that includes authentication information as shown in flow step 414 of FIG. 4.

The S-CSCF can utilize the authentication information to transmit an authentication challenge to the IMS communication device as depicted by flow steps 416 through 420 of FIG. 4. The authentication challenge can force the IMS communication device to submit credentials in a new registration message as depicted by flow steps 422 through 424. In this subsequent registration process, the IMS communication device can provide the S-CSCF authentication data with the registration message. The S-CSCF can compare this information to authentication data supplied by the HSS to validate the IMS communication device.

If the authentication succeeds, the S-CSCF can retrieve a subscription profile associated with the IMS communication device by transmitting to the HSS, at flow step 426 of FIG. 4, a server assignment request (SAR) DIAMETER command. The HSS can respond, at flow step 428, with a server assignment (SAA) DIAMETER command which includes the subscription profile. The S-CSCF can then notify the IMS communication device that it is registered with the IMS network as depicted by flow steps 430 through 434 of FIG. 4. The subscription profile can include one or more initial filter criteria (iFCs) which can be used to provision the application servers of a server office. iFCs can be used for providing call origination features such as caller ID blocking, 7-digit dialing, and so on as described for FIG. 1.

At method step 220 a call processing event can occur which can cause one or more application servers to initiate a request responsive to a call processing request initiated by the IMS communication device, or to address a network fault that has been detected by the application server such as, for example, during a server office failover. The request can include a request for device information and/or dynamic device information, which can be performed without a third party registration process being initiated by the CSCF. Each application server can construct an AVP field with the request and insert it into a User Data Request (UDR) command that is transmitted to the HSS as shown by flow steps 436 and 440 of FIG. 4, respectively.

The HSS receives the UDR commands at step 222 and identifies the request for device information and/or dynamic device information by retrieving this information from the AVP fields of each UDR command. If the HSS locates with identification information of the IMS communication device dynamic device information previously stored, then the HSS proceeds to step 230 where it creates an AVP field with the dynamic device information, and inserts it into User Data Answer (UDA) commands, which are then transmitted at method step 232 to application servers 1 and 2. If the HSS does not locate in its memory banks dynamic device information at step 222, then the HSS transmits device information in a UDA command to application servers 1 and 2 without "dynamic" device information such as a GRUU. The UDA transmissions are depicted at flow steps 438 and 442 of FIG. 4, respectively.

FIG. 3 depicts embodiments for updating dynamic device information stored in the HSS. In one embodiment, an application server can request an update of the device information, the dynamic device information, or both of a particular IMS communication device. The application server can determine at method step 302 whether the IMS communication device has device information and/or dynamic device information such as a GRUU and/or feature tags that require an update. If dynamic device information requires updating, the application server can proceed to method step 304 where it constructs an AVP field with the updated dynamic device information, inserts it into a Profile Update Request (PUR), and transmits it to the HSS at method step 306. If dynamic device information is not detected at step 302, the application server proceeds to step 308 where it transmits updated device information to the HSS a PUR command without dynamic device information. At method step 310, the HSS can retrieve the updated device information if any, and/or the updated dynamic device information if any from the PUR command and modify or replace a prior version of the device information and/or dynamic device information of the IMS communication device in question. At step 312, the HSS can transmit a Profile Update Answer (PUA) command acknowledging the update. Method steps 302-312 are depicted by flow steps 450 and 452 of FIG. 4.

To maintain a CSCF up to date with dynamic device information changes, the HSS can also send the CSCF at method step 314 a Push Profile Request (PPR) command with an AVP field including the updated dynamic device information. The CSCF can respond at method step 316 with a Push Profile Answer (PPA) acknowledging the update. Method steps 314-316 are depicted by flow steps 454 and 456 of FIG. 4.

The foregoing embodiments of methods 200-300 provide a technique for circumventing or at least reducing the need for third party registrations, which can be useful for reduce traffic loads.

Figure 5:
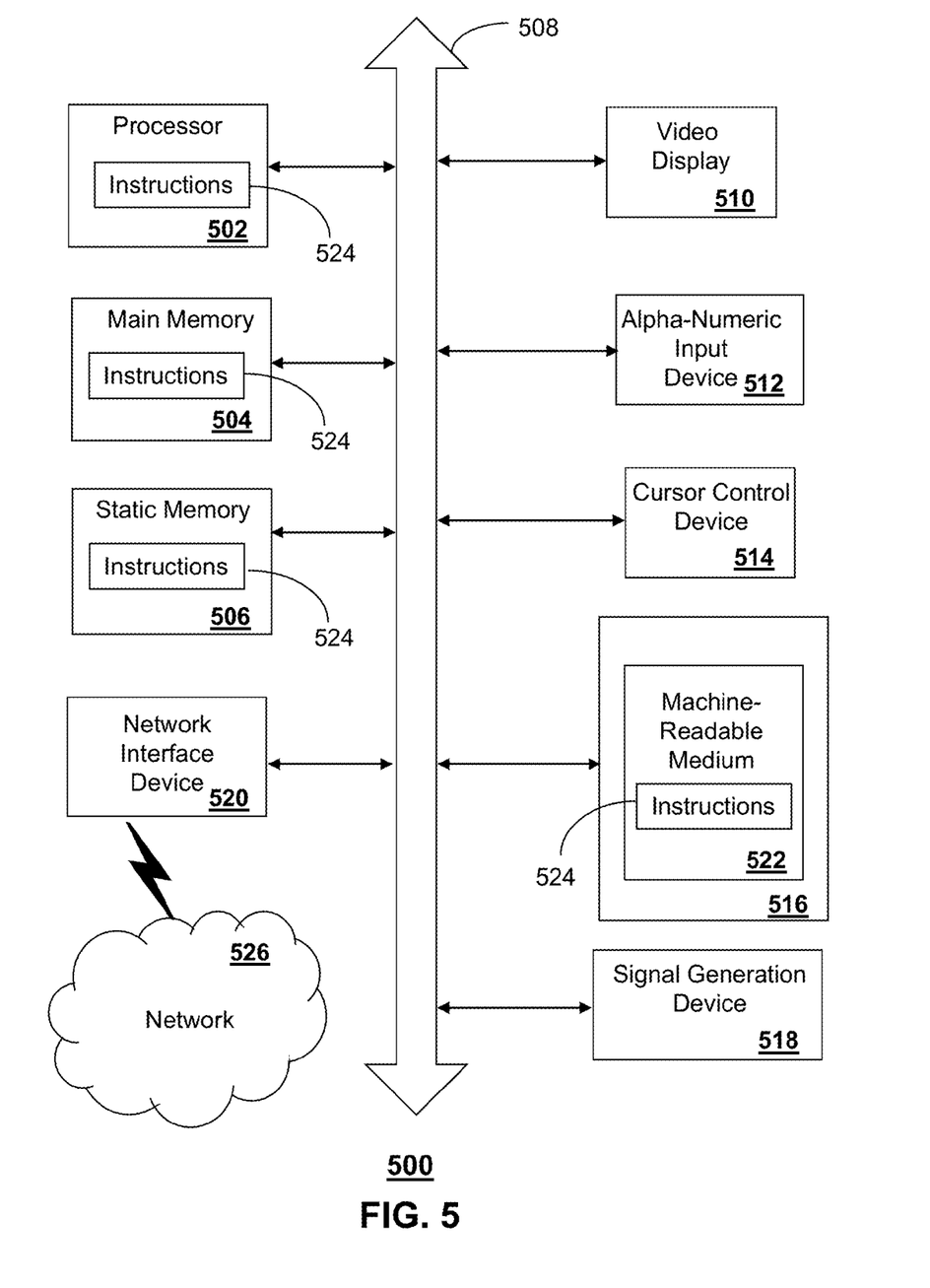
FIG. 5 is a diagrammatic representation of a machine in the form of a computer system within which a set of instructions, when executed, may cause the machine to perform any one or more of the methods discussed herein.

FIG. 5 depicts an exemplary diagrammatic representation of a machine in the form of a computer system 500 within which a set of instructions, when executed, may cause the machine to perform any one or more of the methods discussed above. One or more instances of the machine can operate, for example, as the CDs and the network elements of the IMS networks shown in FIG. 1 as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, or a solid state display. The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a non-transitory machine-readable medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over a network 526 using the instructions 524. The instructions 524 may further be transmitted or received over the network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methods of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, SDR, LTE) are contemplated for use by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A call session control function server, comprising:
a memory that stores executable instructions; and a processor coupled to the memory, wherein the processor responsive to executing the instructions facilitates performance of operations comprising: receiving a registration request initiated by a communication device to acquire service from a communication network from which the call session control function server operates; determining whether the registration request includes dynamic device information of the communication device comprising a globally routable user agent uniform resource identifier assigned to the communication device and a feature tag descriptive of operational features of the communication device; transmitting to a home subscriber server a multimedia authentication request message including the dynamic device information for storage in the home subscriber server responsive to determining that the registration request includes the dynamic device information; and transmitting to the home subscriber server the multimedia authentication request message without dynamic device information responsive to determining that the registration request does not include the dynamic device information, wherein the home subscriber server retrieves the dynamic device information included in an attribute value pair field and stores the dynamic device information in association with the communication device for future retrieval by a requesting a call session control function.

2. The call session control function server of claim 1, wherein the transmitting to the home subscriber server of the multimedia authentication request message occurs responsive to determining that the registration request does not include the dynamic device information.

3. The call session control function server of claim 1, wherein the dynamic device information stored in the home subscriber server enables an application server to retrieve the dynamic device information without causing the call session control function server to initiate a third party registration process.

4. The call session control function server of claim 1, wherein the multimedia authentication request message comprises an attribute value pair field including the dynamic device information, the operations further comprising: receiving in response to the multimedia authentication request message, an answer comprising authentication information; and transmitting an authentication challenge to the communication device based on the authentication information, wherein the communication device submits credentials in a new registration message in response to the authentication challenge.

5. The call session control function server of claim 1, wherein the operations further comprise: constructing an attribute value pair field comprising the dynamic device information; inserting the attribute value pair field in the multimedia authentication request message; and transmitting the multimedia authentication request message to the home subscriber server.

6. The call session control function server of claim 1, wherein the call session control function server is a serving call session control function server.

7. The call session control function server of claim 1, wherein the operations further comprise: receiving a second registration request; determining that the second registration request includes updated dynamic device information; and
transmitting to the home subscriber server a second multimedia authentication request message including the updated dynamic device information for updating the dynamic device information previously stored by the home subscriber server.

8. The call session control function server of claim 1, wherein the globally routable user agent uniform resource identifier of the communication device is shared with another communication device.

9. The call session control function server of claim 1, wherein the call session control function server is a serving call session control function server.

10. A machine-readable storage medium, comprising executable instructions that, when executed by a processor, facilitate performance of operations, comprising: receiving a registration request initiated by a communication device to acquire service from a communication network from which a call session control function server operates; determining whether the registration request includes dynamic device information of the communication device comprising a globally routable user agent uniform resource identifier assigned to the communication device and a feature tag descriptive of operational features of the communication device; transmitting to a home subscriber server a multimedia authentication request message including the dynamic device information for storage in the home subscriber server responsive to determining that the registration request includes the dynamic device information; and transmitting to the home subscriber server the multimedia authentication request message without dynamic device information responsive to determining that the registration request does not include the dynamic device information, wherein the home subscriber server retrieves the dynamic device information included in an attribute value pair field and stores the dynamic device information in association with the communication device for future retrieval by a requesting a call session control function.

11. The machine-readable storage medium of claim 10, wherein the transmitting to the home subscriber server of the multimedia authentication request message occurs responsive to determining that the registration request does not include the dynamic device information.

12. The machine-readable storage medium of claim 11, wherein dynamic device information stored in the home subscriber server enables an application server to retrieve the dynamic device information without causing a call session control function server to initiate a third party registration process.

13. The machine-readable storage medium of claim 10, wherein the multimedia authentication request message comprises an attribute value pair field including the dynamic device information, the operations further comprise:
receiving in response to the multimedia authentication request message, an answer comprising authentication information; and transmitting an authentication challenge to the communication device based on the authentication information, wherein the communication device submits credentials in a new registration message in response to the authentication challenge.

14. The machine-readable storage medium of claim 10, wherein the operations further comprise: constructing an attribute value pair field comprising the dynamic device information; inserting the attribute value pair field in the multimedia authentication request message; and transmitting the multimedia authentication request message to the home subscriber server.

15. The machine-readable storage medium of claim 10, wherein the globally routable user agent uniform resource identifier of the communication device is shared with another communication device.

16. The machine-readable storage medium of claim 10, wherein the operations further comprise: receiving a second registration request; determining that the second registration request includes updated dynamic device information; and transmitting to the home subscriber server a second multimedia authentication request message including the updated dynamic device information for updating the dynamic device information previously stored by the home subscriber server.

17. A method, comprising: receiving, by a call session control function device server, a registration request initiated by a communication device to acquire service from a communication network from which the call session control function server operates;

determining, by the call session control function device server, whether the registration request includes dynamic device information of the communication device comprising a globally routable user agent uniform resource identifier assigned to the communication device and a feature tag descriptive of operational features of the communication device;

transmitting, by the call session control function device server, to a home subscriber server a multimedia authentication request message including the dynamic device information for storage in the home subscriber server responsive to determining that the registration request includes the dynamic device information; and transmitting, by an application server, to the home subscriber server the multimedia authentication request message without dynamic device information responsive to determining that the registration request does not include the dynamic device information, wherein the home subscriber server retrieves the dynamic device information included in an attribute value pair field and stores the dynamic device information in association with the communication device for future retrieval by a requesting a call session control function.

18. The method of claim 17, wherein the multimedia authentication request message is received from the application server without causing the call session control function server to initiate a third party registration process.

19. The method of claim 17, wherein the multimedia authentication request message comprises a first attribute value pair field including the request for the dynamic device information.

20. The method of claim 19, comprising: transmitting, by the application server, to the home subscriber server a profile update request command including an update to the dynamic device information; updating, by the home subscriber server, the dynamic device information to obtain updated dynamic device information according to the update to the dynamic device information; transmitting, by the home subscriber server, to the application server a profile update answer command acknowledging the update;

transmitting, by the home subscriber server, to the call session control function server a push profile request command including the updated dynamic device information;

updating, by the call session control function server, the dynamic device information according to the update to the dynamic device information; and receiving, by the home subscriber server, from the call session control function server a profile update answer command acknowledging the update.

\* \* \* \* \*